(12) United States Patent
Muramatsu et al.

(10) Patent No.: US 7,246,024 B2
(45) Date of Patent: Jul. 17, 2007

(54) SENSOR MALFUNCTION DETECTION SYSTEM FOR GAS-TURBINE ENGINE

(75) Inventors: Hironori Muramatsu, Wako (JP); Yukinobu Sugitani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 11/090,100

(22) Filed: Mar. 28, 2005

(65) Prior Publication Data

US 2005/0222822 A1 Oct. 6, 2005

(30) Foreign Application Priority Data

Mar. 31, 2004 (JP) .............................. 2004-106420
May 26, 2004 (JP) .............................. 2004-156635

(51) Int. Cl.
*G01C 25/00* (2006.01)
*G01M 17/00* (2006.01)

(52) U.S. Cl. ........................ 702/116; 702/35; 701/34; 60/39.281

(58) Field of Classification Search .................. 702/35, 702/116; 701/34; 60/39.281
See application file for complete search history.

(56) References Cited

U.S. PATENT DOCUMENTS

| | | | | |
|---|---|---|---|---|
| 4,639,885 | A | | 1/1987 | Spock et al. .............. 156/272.6 |
| 5,469,735 | A | * | 11/1995 | Watanabe .................. 73/118.1 |
| 5,559,706 | A | * | 9/1996 | Fujita ......................... 701/114 |
| 5,601,513 | A | * | 2/1997 | Arai et al. .................. 477/115 |
| 5,718,111 | A | * | 2/1998 | Ling et al. .................... 60/778 |
| 5,792,949 | A | | 8/1998 | Hewelt ...................... 73/117.3 |
| 5,950,597 | A | * | 9/1999 | Kamio et al. ............... 123/397 |
| 2003/0139860 | A1 | * | 7/2003 | McBrien et al. ............. 701/34 |
| 2003/0171861 | A1 | * | 9/2003 | Kwon .......................... 701/34 |

FOREIGN PATENT DOCUMENTS

| | | | |
|---|---|---|---|
| GB | 2 217 005 A | 10/1989 | .................. 701/34 |
| JP | 58-201069 | 11/1983 | |
| JP | 61-241424 | 10/1986 | |
| JP | 06-050174 | 2/1994 | |

* cited by examiner

*Primary Examiner*—Marc S. Hoff
*Assistant Examiner*—Janet L Suglo
(74) *Attorney, Agent, or Firm*—Squire, Sanders & Dempsey L.L.P.

(57) ABSTRACT

The sensor malfunction detection system for a gas-turbine engine is configured to determine or check once every first predetermined time period whether the outputted value from the sensor is within a permissible range and determines that the sensor is faulty when the result of the check is at least one result between the case of the number of times the outputted value is found not to be within the permissible range exceeding a first predetermined value and the case of the number of times the outputted value is consecutively found not to be within the permissible range exceeding a second predetermined value. Since the system discriminates whether the total number of times the sensor output is found to be outside the permissible range is fewer than the first predetermined value, it can avoid erroneous detection of transient abnormalities caused by noise or the like as sensor malfunction, and since it discriminates whether the number of times the sensor output is consecutively found not to be within the permissible range is fewer than the second predetermined value, it can promptly detect sensor malfunction owing to wire breakage or the like. The system can therefore detect sensor malfunction with good accuracy using a simple configuration.

20 Claims, 11 Drawing Sheets

LOGIC OF THREE-VALUE COMPARISON

FIG. 7

| | COMPARISON RESULTS | DISCRIMINATION | | SIGNAL TO BE USED | ABNORMAL SIGNAL |
|---|---|---|---|---|---|
| A① | A=B, A=C, B=C | ALL OK | Case1 | A | |
| A② | A=B, A=C, B≠C | A IS MOST RELIABLE | Case1 | A | |
| A③ | A=B, A≠C, B=C | B IS MOST RELIABLE | Case1 | B | |
| A④ | A=B, A≠C, B≠C | C IS NG | Case2 | A | C |
| A⑤ | A≠B, A=C, B=C | C IS MOST RELIABLE | Case1 | C | |
| A⑥ | A≠B, A=C, B≠C | B IS NG | Case2 | A | B |
| A⑦ | A≠B, A≠C, B=C | A IS NG | Case2 | B | A |
| A⑧ | A≠B, A≠C, B≠C | DISCRIMINATION IMPOSSIBLE | Case3 | FROZEN | A, B, C |

LOGIC OF FOUR-VALUE COMPARISON

FIG. 10

| | COMPARISON RESULTS | DISCRIMINATION | | SIGNAL TO BE USED | ABNORMAL SIGNAL |
|---|---|---|---|---|---|
| A① | A=D, B=D, C≠D | D IS MOST RELIABLE C IS NG | Case1 | D | C |
| A② | A=D, B≠D, C=D | D IS MOST RELIABLE B IS NG | Case1 | D | B |
| A③ | A=D, B≠D, C≠D | B, C ARE NG | Case2 | A | B, C |
| A④ | A≠D, B=D, C=D | D IS MOST RELIABLE A IS NG | Case1 | D | A |
| A⑤ | A≠D, B=D, C≠D | A, C ARE NG | Case2 | B | A, C |
| A⑥ | A≠D, B≠D, C=D | A, B ARE NG | Case2 | C | A, B |
| A⑦ | A≠D, B≠D, C≠D | DISCRIMINATION IMPOSSIBLE | Case3 | FROZEN | A, B, C, D |

SENSOR MALFUNCTION DETECTION SYSTEM FOR GAS-TURBINE ENGINE

BACKGROUND OF THE INVENTION

1. Field of the Invention

This invention relates to a sensor malfunction detection system for a gas-turbine engine, more specifically a sensor malfunction detection system for a gas-turbine aeroengine used in aircraft.

2. Description of the Related Art

Gas-turbine engine control is performed by using the outputs of a group of sensors installed in the engine to discriminate the engine operating condition and conducting various kinds of control, including calculation and control of the amount of fuel to be supplied, based on the discriminated condition. If a sensor should fail because of wire breakage or the like, its output will deviate from the right value. This makes it necessary to detect whether any of the sensors are faulty.

Japanese Laid-open Patent Application No. Sho 61(1986)-241424 teaches a technique for selecting the best value among two sampled values of a sensor output and composite signals representing nominal values with respect to parameters thereof.

Japanese Laid-open Patent Application No. Hei 6(1994)-050174 teaches a technique that determines or checks whether sensor output is within an a permissible range, responds to each determination that it is not within the permissible range by resetting the upper and lower limits of the permissible range in accordance with the direction of the deviation, counts the number of times that the inputted value in the next cycle swings up and down within the permissible range within a predetermined time period, and determines that the sensor is faulty when the count value exceeds a predetermined value.

The conventional technique of 61-241424 requires creation of composite signals representing nominal values with respect to parameters corresponding to the sensor output and selection of the best value from among these and two sampled values of the sensor output, while the conventional technique of 6-050174 requires resetting of the upper and lower limits of the permissible range in accordance with the received sensor output. Thus, both techniques are complicated.

SUMMARY OF THE INVENTION

An object of this invention is therefore to overcome the aforesaid problem and to provide a sensor malfunction detection system for a gas-turbine engine that can detect sensor malfunction with good accuracy using a simple configuration.

In order to achieve the object, the present invention provides, in the first aspect, a system for detecting sensor malfunction of a gas-turbine engine, comprising: a sensor installed at the engine and outputting a value indicative of operating condition of the engine; a determiner inputting the value outputted from the sensor and determining once every first predetermined time period whether the outputted value is not within a permissible range; and a discriminator inputting a result of determination of the determiner and discriminating that the sensor is faulty, when the result is at least one of a case in which number of times, the outputted value is determined not to be within the permissible range, is not smaller than a first predetermined value, and a case in which the number of times, the outputted value is consecutively determined not to be within the permissible range, is not smaller than a second predetermined value.

In order to achieve the object, the present invention provides, in the second aspect, a system for detecting sensor malfunction of a gas-turbine engine, comprising: a pair of sensors each installed at the engine and each outputting a value indicative of operating condition of the engine; a determiner inputting the values outputted from the sensors and determining whether each of the outputted values is normal or abnormal by comparing the outputted values with each other; a first discriminator inputting a result of determination of the determiner and discriminating once every first predetermined time period whether one of the outputted values is determined to be abnormal; and a second discriminator inputting a result of discrimination of the first discriminator and discriminating that one of the sensors whose output value is determined to be abnormal is faulty, when the result is at least one of a case in which number of times, the one of the outputted values is determined to be abnormal range, is not smaller than a first predetermined value, and a case in which the number of times, the one of the outputted values is consecutively determined to be abnormal, is not smaller than a second predetermined value.

BRIEF DESCRIPTION OF THE DRAWINGS

FIG. 7 is a diagram used to explain selection of a signal usable as a control signal based on the result of the three-value comparison of FIG. 6 and concomitant acceptability determination for checking whether the signal is abnormal;

FIG. 10 is a diagram used to explain selection of a signal usable as a control signal based on the result of the four-value comparison of FIG. 9 and concomitant acceptability determination for checking whether the signal is abnormal.

DETAILED DESCRIPTION OF THE PREFERRED EMBODIMENT

Sensor malfunction detection system for a gas-turbine engine according to preferred embodiment of this invention will now be explained with reference to the drawings.

Figure 1:
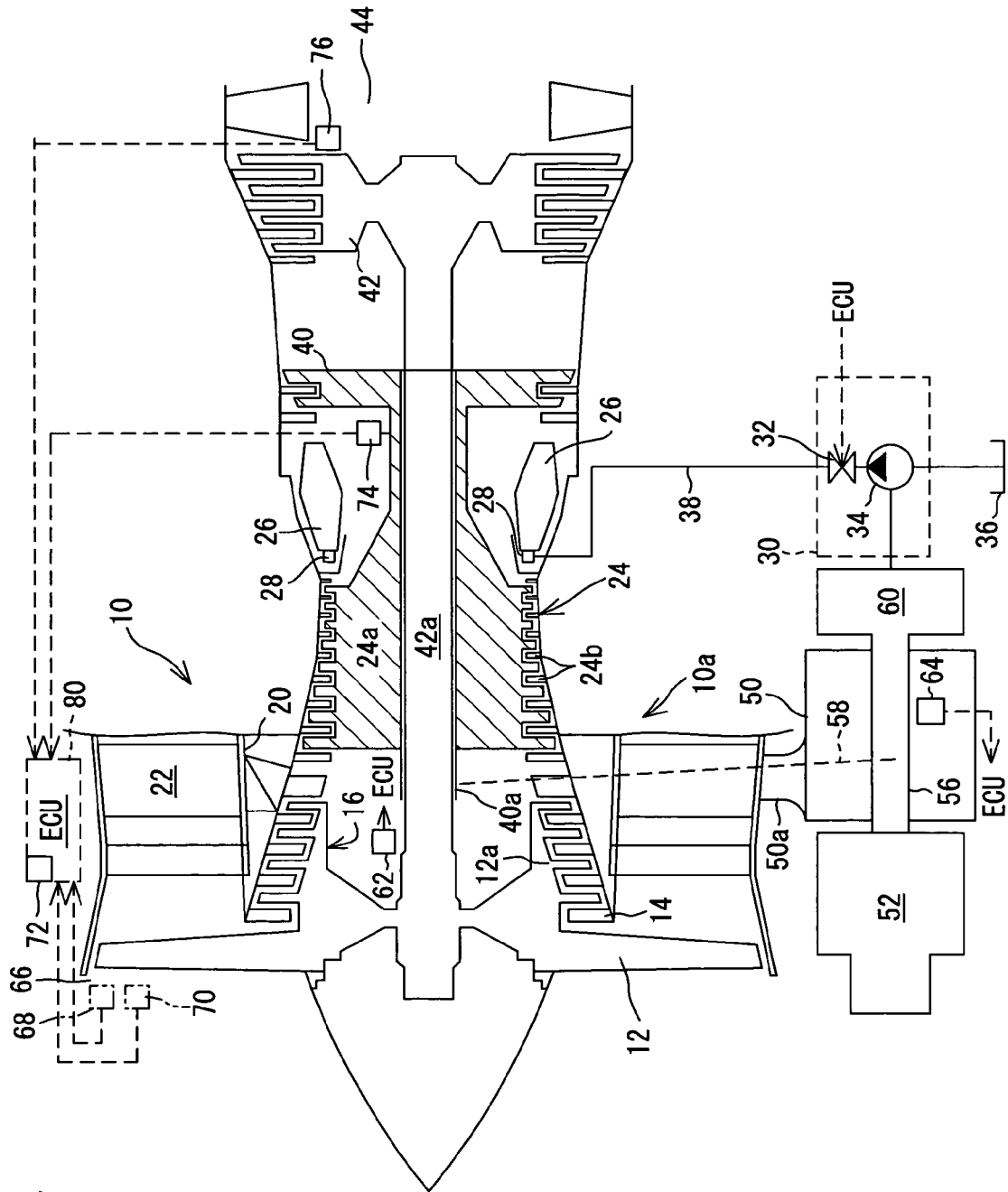
FIG. 1 is an overall schematic view of a gas-turbine engine control unit capable of utilizing a sensor malfunction detection system for a gas-turbine engine according to an embodiment of this invention.

FIG. 1 is an overall schematic view of a gas-turbine engine control unit capable of utilizing a sensor malfunction detection system according to an embodiment of this invention.

The sensor malfunction detection system according to this invention is a system for detecting malfunction that is used in the gas-turbine engine control unit. Therefore, in order to facilitate understanding of ensuing explanation of the sensor malfunction detection system, the gas-turbine engine control unit will be explained first.

The explanation will be made taking a gas-turbine aeroengine for aircraft as an example of the gas-turbine engine. Four types of gas-turbine aeroengines are commonly used in aircraft: the turbojet engine, turbofan engine, turboprop engine and turboshaft engine. A two-spool (shaft) turbofan engine will be taken as an example in the following explanation.

In FIG. 1, reference numeral 10 designates a turbofan engine (gas-turbine engine; hereinafter referred to as "engine"). Reference numeral 10a designates its main engine unit. The engine 10 is mounted at an appropriate location of an airframe (not shown). The engine 10 is equipped with a fan 12 (rotor blades) that sucks in air while rotating rapidly. A rotor 12a is formed integrally with the fan 12. The rotor 12a and a stator 14 facing it together form a low-pressure compressor 16 that compresses the sucked-in air and pumps it rearward.

A duct (bypass) 22 is formed in the vicinity of the fan 12 by a separator 20. Most of the air pulled in passes through the duct 22 to be jetted rearward of the engine without being burned at a later stage (in the core). The force of the air accelerated rearward by the fan produces a force of reaction that acts on the aircraft (not shown) as a propulsive force (thrust). Most of the propulsion is produced by the air flow from the fan.

The air compressed by the low-pressure compressor 16 flows rearward to a high-pressure compressor 24 where it is further compressed by a rotor 24a and a stator 24b and then flows rearward to a combustion chamber 26.

The combustion chamber 26 is equipped with fuel nozzles 28 that are supplied with pressurized fuel metered by an FCU (Fuel Control Unit) 30. The FCU 30 is equipped with a fuel metering valve 32. Fuel pumped by a fuel pump (gear pump) 34 from a fuel tank 36 located at an appropriate part of the airframe is metered by the fuel metering valve 32 and supplied to the fuel nozzles 28 through a fuel supply line 38.

The sprayed fuel is mixed with compressed air exiting the high-pressure compressor 24 and the mixture is burned after being ignited at engine starting by an exciter (not shown in FIG. 1) and a spark plug (not shown). Once the air-fuel mixture begins to burn, the air-fuel mixture composed of compressed air and fuel is continuously supplied and burned.

The hot high-pressure gas produced by the combustion is sent to a high-pressure turbine 40 and rotates the high-pressure turbine 40 at high speed. The high-pressure turbine 40, more specifically its rotor, is connected to the rotor 24a of the high-pressure compressor 24 by a high-pressure turbine shaft 40a. The rotor 24a is therefore also rotated.

After driving the high-pressure turbine 40, the hot high-pressure gas is sent to a low-pressure turbine 42, which rotates at relatively low speed. The low-pressure turbine 42, more precisely its rotor, is connected to the rotor 12a of the low-pressure compressor 16 through a low-pressure turbine shaft 42a. The rotor 12a and the fan 12 are therefore also rotated. The high-pressure turbine shaft 40a and the low-pressure turbine shaft 42a are provided in a dual coaxial structure.

The hot high-pressure gas passing through the low-pressure turbine 42 (the turbine exhaust gas) is mixed with the air stream passing through the duct 22 without compression or combustion and the combined flow is jetted rearward of the engine through a jet nozzle 44.

An accessory drive gearbox (hereinafter referred to as "gearbox") 50 is attached through a stay 50a to the undersurface at the front end of the main engine unit 10a. An integrated starter/generator (hereinafter called "starter") 52 is attached to the front of the gearbox 50. The FCU 30 is located at the rear of the gearbox 50.

The engine 10 is started by operating the starter 52 to rotate a shaft 56. The rotation is transmitted to the high-pressure turbine shaft 40a through a drive shaft 58 (and a gear mechanism including a bevel gear etc.; not shown) so as to pull in air needed for combustion.

The rotation of the shaft 56 is also transmitted to a PMA (Permanent Magnet Alternator) 60 and the high-pressure fuel pump 34. The fuel pump 34 is therefore driven to spray fuel from the fuel nozzles 28 as explained above. The resulting air-fuel mixture is ignited to start combustion.

When the engine 10 reaches self-sustaining operating speed, the rotation of the high-pressure turbine shaft 40a is transmitted back through the drive shaft 58 (and the gear mechanism including the bevel gear etc.) to the shaft 56 to drive the fuel pump 34 and also drive the PMA 60 and the starter 52. The PMA 60 therefore generates electricity and the starter 52 supplies power to equipment in and on the airframe (not shown).

An N1 sensor (speed sensor) 62 installed near the low-pressure turbine shaft 42a of the engine 10 outputs a signal proportional to the speed of the low-pressure turbine (speed of the low-pressure turbine shaft 42a) N1. An N2 sensor (speed sensor) 64 installed near the shaft 56 outputs a signal proportional to the speed of the high-pressure turbine (speed of the high-pressure turbine shaft 40a) N2.

A T1 sensor (temperature sensor) 68 and a P1 sensor (pressure sensor) 70 installed near an air intake 66 at the front of the main engine unit 10a output signals proportional to the temperature T1 and the pressure P1 of the inflowing air at that location. A P0 sensor (pressure sensor) 72 installed inside an ECU (Electronic Control Unit) explained below outputs a signal proportional to atmospheric pressure P0 acting on the engine 10. A temperature sensor (not shown) provided inside the ECU outputs a signal proportional to the temperature of the ECU.

A P3 sensor (pressure sensor) 74 installed downstream of the rotor 24a outputs a signal proportional to the output pressure P3 of the high-pressure compressor 24. An EGT sensor (temperature sensor) 76 installed at an appropriate location downstream of the low-pressure turbine 42 outputs a signal proportional to the exhaust gas temperature EGT (temperature of the exhaust gas exiting the low-pressure turbine 42).

The aforementioned ECU (designated by reference numeral 80) is incorporated at an upper end position of the main engine unit 10a. The outputs of the sensors mentioned above are sent to the ECU 80.

Figure 2:
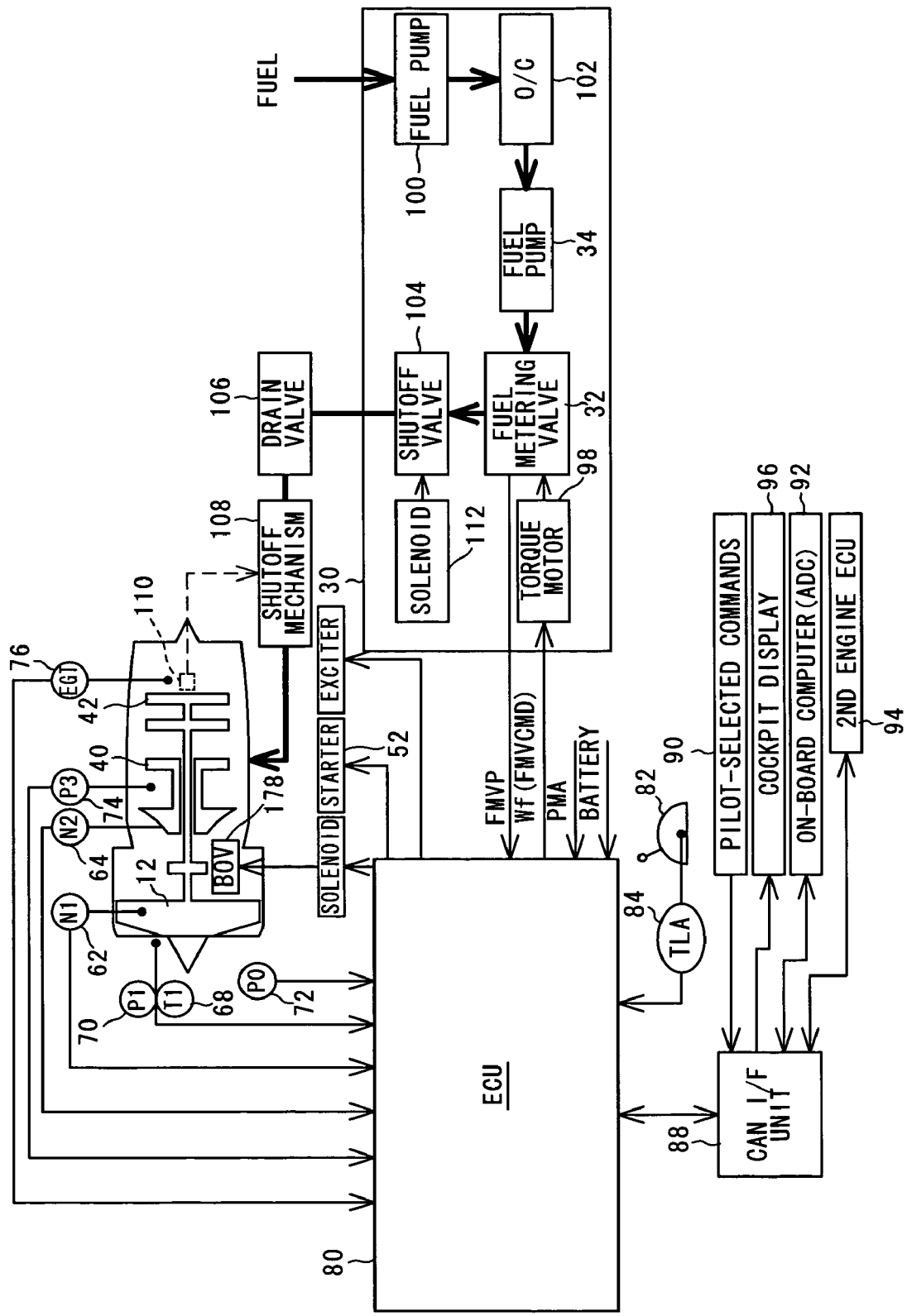
FIG. 2 is a block diagram used to explain the structures of an ECU and an FCU in the system shown in FIG. 1.

The ECU 80 and the FCU 30 are illustrated in the block diagram of FIG. 2, with the overall configuration of the FCU 30 being shown in detail.

In addition to the group of sensors set out above, a TLA (thrust lever angle) sensor 84 installed near a thrust lever (throttle lever) 82 provided near the pilot's seat (cockpit; not shown) outputs a signal proportional to the thrust lever angle or position TLA set or inputted by the pilot (corresponding to the pilot desired thrust). The output of the TLA sensor 84 is also forwarded to the ECU 80. In FIG. 2, and also in FIG. 3 discussed later, the sensors (P0 sensor, TLA sensor etc.) are indicated by the symbols for the parameters they detect (P0, TLA etc.).

An FMVP sensor (valve position sensor; not shown in FIG. 2) installed at an appropriate location in the FCU 30 outputs a signal proportional to the valve position FMVP of the fuel metering valve 32. The output of the FMVP sensor is also forwarded to the ECU 80.

The ECU 80 is also connected with a CAN (Control Area Network) communications interface unit 88 through which it receives (or sends) pilot-selected commands 90 from devices other than the thrust lever 82, data from an on-board computer (Air Data Computer or ADC) 92 (e.g., Mach number Mn, (pressure) altitude ALT and outside air temperature (total air temperature TAT and (absolute) surface air temperature SAT)) and data from an ECU 94 of a second engine (not shown). The data in the ECU 80 are sent through the communications interface unit 88 to be displayed on a display 96 located in the cockpit.

The ECU 80 is activated once every 10 msec (millisecond) to perform operating condition (i.e., transient/steady-state) discrimination and malfunction detection based on the inputted values and, once every 40 msec, calculates a command value (control input or manipulated variable) Wf for controlling the quantity of fuel to be supplied to the engine 10 (fuel flow rate), in response to the thrust lever position TLA (pilot desired thrust), so as to decrease the difference between the low-pressure turbine shaft speed (low-pressure turbine speed) N1 and a desired speed N1com. The calculated command value Wf is sent to the FCU 30 as an energizing current command value for a torque motor 98.

The ECU 80 monitors whether or not the detected values of the low-pressure turbine speed N1 and a high-pressure turbine speed N2 exceeds corresponding limit values (e.g., values set to 107% of the respective maximum speeds). When either of the detected low-pressure turbine speed N1 and the high-pressure turbine speed N2 exceeds the limit value, the ECU 80 makes an overspeed discrimination and then determines and sends to the FCU 30 the torque motor 98 energizing current command value for reducing the fuel flow rate to the engine 10 to a predetermined value, specifically to zero or a minimal value.

In addition, the ECU 80 determines the command value Wf to regulate the flow rate of fuel to the engine 10 so as to decrease the difference between the change rate N2dot of the detected high-pressure turbine speed N2 (derivative of N2; acceleration/deceleration factor) and a desired acceleration/deceleration factor N2dotcom. Specifically, the ECU 80 determines an energizing current command value for the torque motor 98 and sends it to the FCU 30.

The FCU 30 is equipped with a low-pressure fuel pump 100 that pumps fuel from the fuel tank 36 (not shown in FIG. 2) and supplies it to the high-pressure (fuel) pump 34 through a filter (and oil cooler) 102. The high-pressure pump 34 raises the fuel to a high pressure and supplies it to the fuel metering valve 32. The fuel metering valve 32 is connected with the torque motor 98 that sets its spool position. The flow rate of the fuel pressurized by the fuel pump 34 is therefore adjusted (metered) by the fuel metering valve 32 according to the spool position thereof. The metered fuel is supplied to the fuel nozzles 28 through a shutoff valve 104, a drain valve 106 and a shutoff mechanism 108. The ECU 80 calculates the command value Wf indicating the flow rate of fuel to be supplied to the engine 10 at 40 msec intervals. The calculated command value Wf is used to control the supply of fuel so as to achieve the fuel flow rate calculated by the FCU 30.

An emergency stop switch 110 is connected to the low-pressure turbine shaft 42a. If the low-pressure turbine shaft 42a should be displaced for some reason, the emergency stop switch 110 will turn on to operate the shutoff mechanism 108 and mechanically block supply of fuel to the fuel nozzles 28. In addition, a solenoid 112 is provided in association with the shutoff valve 104. The solenoid 112 is responsive to the pilot-selected command 90 for operating the shutoff valve 104 to block supply of fuel to the fuel nozzles 28.

Figure 3:
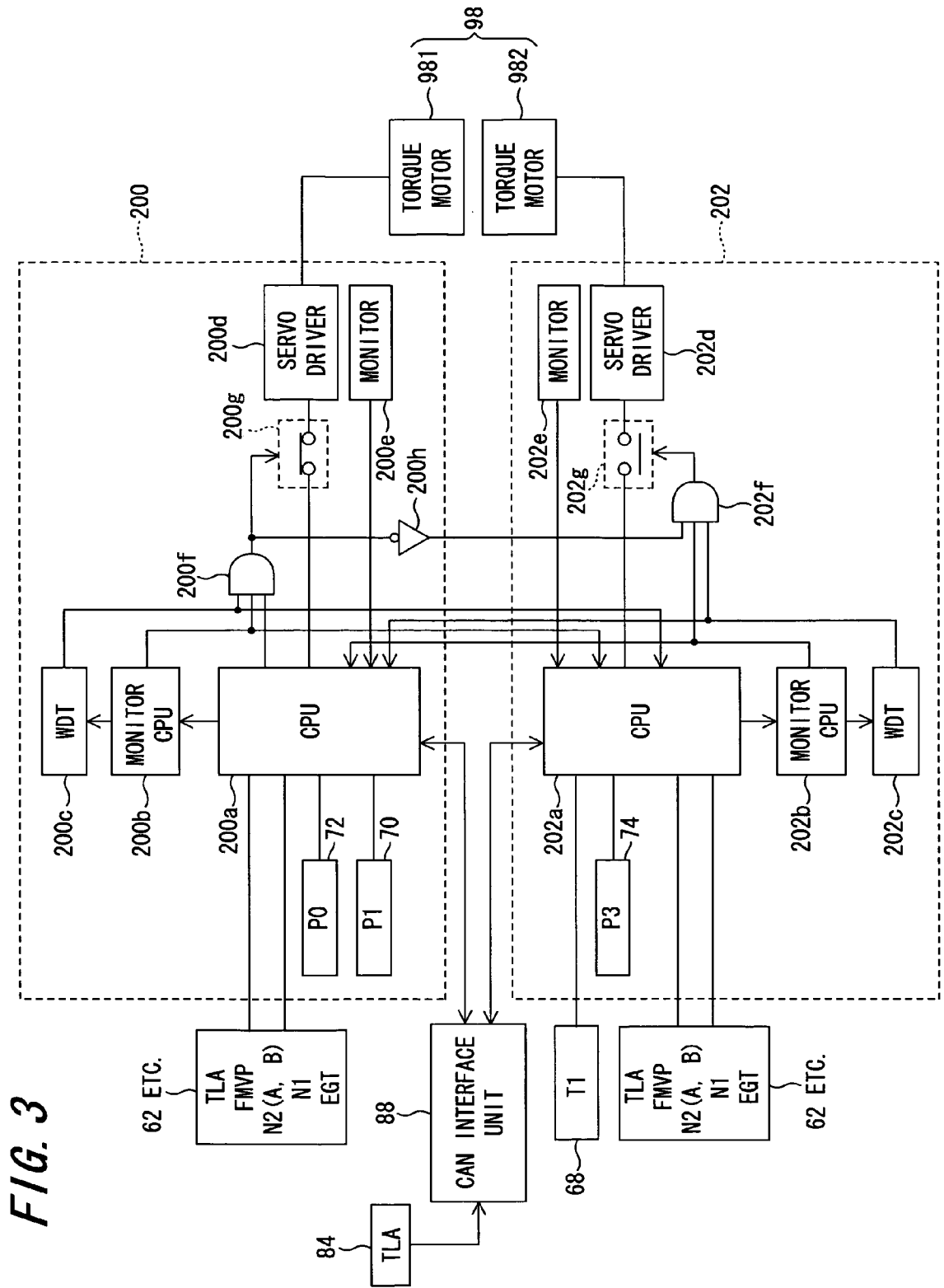
FIG. 3 is a block diagram showing the physical components constituting the ECU and FCU of FIG. 2.

FIG. 3 is a block diagram showing the physical components constituting the ECU 80 and FCU 30.

Because the engine 10 is a gas-turbine aeroengine, the ECU 80 and FCU 30 are composed of a primary lane 200 and a secondary lane 202, respectively equipped with a CPU 200a and CPU 202a for conducting the aforesaid operations, a monitor CPU 200b and monitor CPU 202b for monitoring the operation of the CPU 200a and CPU 202a, and WDTs (watchdog timers) 200c and 202c for monitoring the operation of the monitor CPUs. When it is monitored to detect that an abnormal condition has arisen in the lane 200, the lane 202 conducts fuel supply control in place of the lane 200.

The two CPUs 200a and 202a operate as the ECU 80 and FCU 30. That is, they use the outputs of the sensors (shown there) to calculate the energizing current command value for supply to the torque motor 98 and forward the calculated value through servo drivers 200d, 202d (not shown in FIG. 2) to the torque motor 98. (The operation of the servo drivers 200d, 202d is monitored by monitors (monitor circuits) 200e, 202e.) As is clear from FIG. 3, the torque motor 98 actually comprises two torque motors, one designated 981 (for the primary lane 200) and the other designated 982 (for the secondary lane 202). So long as the CPU 200a of the primary lane 200 operates normally, only the primary lane output is sent to the torque motor 98 (the torque motor 981).

Moreover, two or more of many of the aforesaid various sensors are also provided. As shown, three TLA sensors 84 are provided, and their outputs are inputted to the two lanes 200, 202. Two each of the N1 sensor 62, the EGT sensor 76, and the FMVP sensor (not shown in FIG. 2) are provided, and their outputs are inputted to the two lanes 200, 202. Further, four N2 sensors 64 are provided, two (designated A and B) for each lane. The outputs of the sensors A and B of each pair are inputted to the associated lane 200, 202.

The N2 sensors 64 are made of magnetic pickups. Four of the same structure are installed near the shaft 56 with proximity to each other. The N1 sensors 62 are also made of magnetic pickups of the same structure. Two are installed near the low-pressure turbine shaft 42a. Also in case of each of the other sensors, a plurality of sensors of the same structure are installed. Sensors of the same type are configured to produce identical outputs.

The outputs of the P1 sensor 70 and P0 sensor 72 are inputted to the lane 200, and the outputs of the P3 sensors 74 are inputted to only the lane 202. The reason for inputting the outputs of these sensors only to one or the other of the two lanes 200, 202 is that they are less significant than the outputs of the N1 sensors 62, N2 sensors 64 and other sensors that detect turbine speed. Sensor outputs that are inputted to only one lane are sent to the other lane via the CAN communications system.

The monitor CPU 200b and WDT 200c in the primary lane 200 constitute self-diagnostic units (circuits) that use the same sensor outputs as the CPU 200a to produce the same outputs as the CPU 200a. The outputs of all three units are sent to an AND circuit 200f. If all corresponding inputs match, i.e., if it is found that primary lane 200 is not operating abnormally, the AND circuit 200f outputs an H-level signal to close a switch 200g, such that the output of the CPU 200a is sent to the servo driver 200d.

The monitor CPU 202b and WDT 202c in the secondary lane 202 constitute self-diagnostic units (circuits) that produce the same outputs from the same sensor outputs and send them to an AND circuit 202f. Further, the output of the AND circuit 200f of the primary lane 200 is inputted to the AND circuit 202f of the secondary lane 202 through an inverter 200h.

Therefore, when inputs of the AND circuit 200f in the primary lane 200 match, the inputs to the AND circuit 202f of the secondary lane 202 do not match. The AND circuit 202f therefore outputs or generates an L-level signal that opens a switch 200g to prevent forwarding of the output of the CPU 202a to the servo driver 202d. On the other hand, when the inputs of the AND circuit 200f in the primary lane 200 do not match, then, insofar as the outputs of the monitor CPU 202b and WDT 202c in the secondary lane 202 match, the AND circuit 202f of the secondary lane 202 outputs an H-level signal that closes a switch 202g to enable forwarding of the output of the CPU 202a to the servo driver 202d.

The outputs of the monitor CPU 200b and WDT 200c of the primary lane 200 are sent to the CPU 202a of the secondary lane 202 and the equivalent outputs of the secondary lane 202 are sent to the CPU 200a of the primary lane 200.

Premised on the forgoing, the sensor malfunction detection system for a gas-turbine engine according to this embodiment will now be explained.

Figure 4:
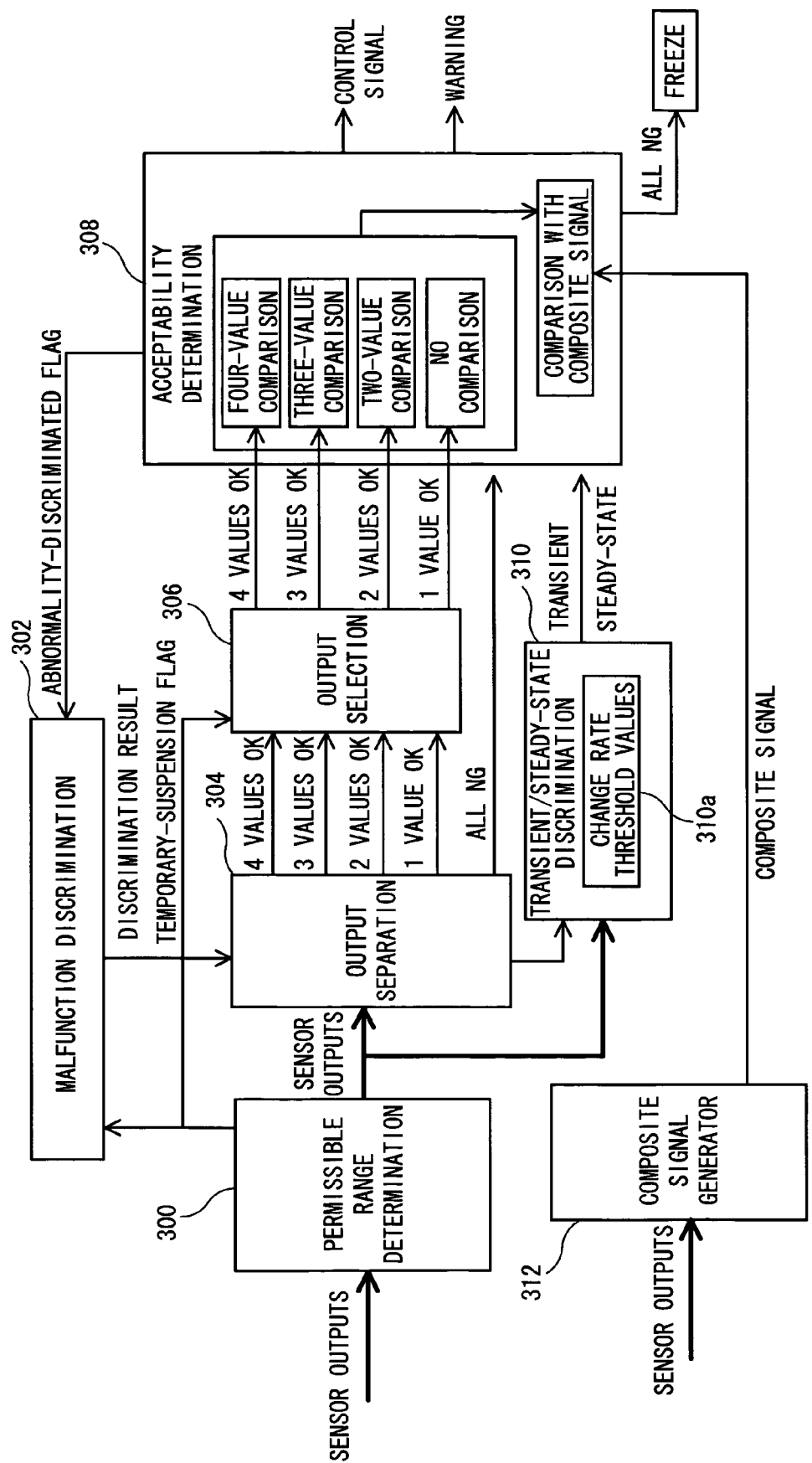
FIG. 4 is a block diagram comprising functional blocks representing those of the operations of the ECU of FIG. 2 involved in determining sensor output acceptability and discriminating transient/steady-state operating condition.

FIG. 4 is a block diagram illustrating the operation of the system, including the operations for determining signal output acceptability and discriminating transient/steady-state operating condition. Basically, the drawing comprises functional blocks representing the operations performed by the ECU 80, specifically the operations performed in parallel by the CPUs 200a, 202a among the four CPUs discussed in the foregoing.

The aforesaid sensor outputs indicating the operating condition of the engine 10 (i.e., the outputted values) are first sent to a low-pass filter (not shown) for removal of noise components. Then, after being subjected to waveform shaping, they are sent to a counter or the like for conversion to parameters indicating the operating condition (e.g., conversion of the outputs of the N1 sensors 62 to rpm equivalent values), and forwarded to a permissible range determination block (determiner) 300 once every 10 msec for checking or determining whether they are within suitably determined permissible ranges, and sent to a malfunction discrimination block (discriminator) 302. The cutoff frequency of the low-pass filter is set or defined in accordance with the sensor outputs so as to remove noise components of the sensor outputs as much as possible, thus removing noise components superimposed on the sensor outputs.

The sensor outputs include the outputs of all of the foresaid sensors, including the outputs of the N1 sensors 62 indicative of the low-pressure turbine speed and the outputs of the N2 sensors 64 indicative of the high-pressure turbine speed. At least two of each type of sensor are provided. The outputs of the four N2 sensors 64, two for each of the lanes 200 and 202, are processed as explained in the following.

Figure 5:
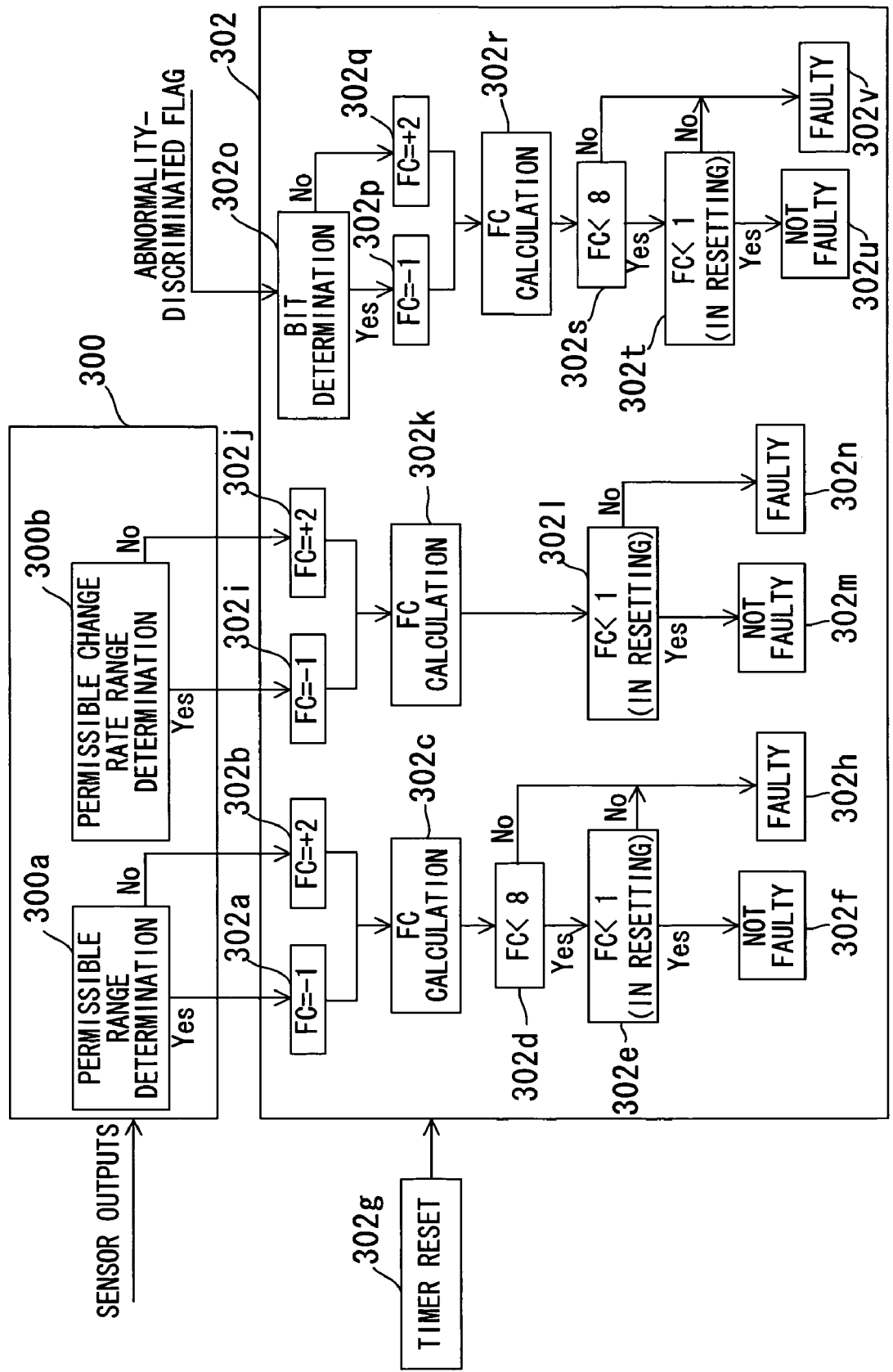
FIG. 5 is a block diagram showing the configuration and operation of the permissible range determination block and malfunction discrimination block shown in FIG. 4.

FIG. 5 is a block diagram comprising functional blocks representing the operations of the permissible range determination block 300 and malfunction discrimination block 302 in further detail.

The sensor outputs filtered by the low-pass filter are subjected to waveform shaping, sent to the counter or the like for conversion to parameters indicating the operating condition (e.g., conversion of the outputs of the N1 sensors 62 to rpm equivalent values), inputted to the permissible range determination block 300 once every 10 msec (first predetermined time period or interval), and sent to step 300a thereof.

Step 300a checks or discriminates whether the sensor outputs are within predetermined permissible ranges set for the individual sensors.

The result of the check in step 300a is sent to the malfunction discrimination block 302. Specifically, when step 300a finds that the sensor outputs are within the permissible ranges, the output (check result) is sent to step 302a of the malfunction discrimination block 302, whose FC (flag counter) is set to −1, and when it finds that the sensor outputs are not within the permissible ranges, the output is sent to step 302b of the malfunction discrimination block 302, whose FC is set to +2.

Next, in step 302c, the total (accumulated) value of FC is calculated by addition to or subtraction from the value of FC in the preceding cycle, whereafter step 302d checks whether the value of FC (total value) is smaller or less than 8 (second predetermined value). The first time this check is made, the value of FC is still −1 or +2, so that the result is ordinarily YES.

The foregoing steps are executed once every 10 msec. After 8 cycles of the steps have been executed (i.e., after 80 msec), step 302e checks whether the value of FC (total value) is smaller or less than 1 (first predetermined value), whereafter the value of FC is reset by a timer reset 302g. When the result in step 302e at the time of the reset is also YES, it is determined or discriminated in the following step 302f that the sensor concerned is not faulty (is normal).

When the sensor being diagnosed has experienced wire breakage or other such malfunction, the fact that its output is outside the permissible range is repeatedly discriminated. As a result, step 302b repeatedly assigns FC the value +2, so that after 4 cycles (40 msec), step 302d finds that the accumulated value of FC calculated in step 302c is no longer smaller than 8 (second predetermined value) and produces a NO result, whereafter the sensor is determined to be faulty in step 302h.

So long as the sensor output is repeatedly found to be within the permissible range during a period of 80 msec, step 302a repeatedly assigns FC the value −1, so that the determination in step 302e is YES and the sensor is found to be normal in step 302f. However, when the sensor output is found to be sporadically or temporarily outside the permissible range three or more times during the period of 80 msec, the determination in step 302e at the time of reset becomes NO, so that step 302h finds or discriminates the sensor to be faulty.

As mentioned above, the ECU 80 and FCU 30 (the fuel control unit, specifically the CPUs 200a, 202a) similarly execute processing once every 10 msec, calculate the command value Wf for regulating the flow rate of fuel to be supplied to the engine 10 every 40 msec, which is m times, more exactly 4 times of 10 msec, and control fuel supply by driving the torque motor 98 so as to supply fuel at the calculated flow rate. The time period required to determine that the sensor is faulty based on the sensor output being found to be outside the permissible range four consecutive times is within the fuel supply control time period (second predetermined time period), more exactly, is equal to the fuel supply control time period.

The fact that 80 msec is required for the malfunction discrimination at the time of reset conducted in step 302e by comparing the value of FC and 1 (first predetermined value) means that the set value 8 (second predetermined value) is a value corresponding to a time period that is equal to or shorter than ½ the time period represented by 1 (first predetermined value).

Some of the sensor outputs sent to the permissible range determination block 300 once every 10 msec (first predetermined time period), specifically the outputs of the N1 sensors 62 and N2 sensors 64, are inputted to step 300b of the permissible range determination block 300. Not all of the sensor outputs but only the outputs of these two types of sensors are inputted because the parameters indicating the turbine speeds are relatively significant.

Step 300b checks or discriminates whether the outputs of the N1 sensor 62 and N2 sensor 64 are within predetermined permissible change rate ranges set for the individual sensors. In other words, step 300b checks or discriminates whether change rates of the outputs of the sensors 62 and 64 are within a second predetermined permissible ranges set for the individual sensors. These values are defined by adding appropriate values to the maximum acceleration rate and the deceleration rate at misfire.

The result of the check in step 300b is sent to the malfunction discrimination block 302. Specifically, when step 300b finds that the sensor outputs are within the permissible change rate ranges, the output (check result) is sent to step 302i of the malfunction discrimination block 302, where FC is assigned the value −1, and when it finds that the sensor outputs are not within the permissible ranges, the output is sent to step 302j, where FC is assigned the value +2.

Next, in step 302k, the accumulated (total) value of FC is calculated by addition to or subtraction from the value of FC in the preceding cycle. Then, at the time of reset upon elapse of 80 msec, step 302l checks whether the value of FC (accumulated value) is smaller than 1 (third predetermined value). When the result is YES, the sensor is determined or discriminated not to be faulty (to be normal) in step 302m, and when it is NO, the sensor is determined or discriminated to be faulty in step 302n.

As is clear from the foregoing, when the result is NO in any of steps 302d, 302e and 302l, the sensor concerned is found to be faulty in step 302h or step 302n.

When any sensor is determined (detected) to be faulty and another sensor of the same type is determined to be normal, the aforesaid fuel supply control is conducted using the output of the normal sensor. When all sensors of the same type are found to be faulty, a predetermined value is set to be used and control is continued. For example, when all of the N1 sensors 62 are determined to be faulty, N1 is set to a value that is equal to or greater than the maximum permissible speed thereof. In this case, the value of N2 becomes the control value at idling. When all of the N2 sensors 64 are determined to be faulty, N2 is set to a value that is equal to or greater than the maximum permissible speed thereof and the fuel supply amount is determined or set to the minimum value. Suitable values are also similarly set in the case of the other parameters.

When the permissible range determination block 300 cannot make a determination, it refrains from making one and forwards the sensor output attached with a temporary-suspension flag. The processing shown on the right side of FIG. 5 will be explained later.

The explanation of FIG. 4 will now be resumed. The output of the malfunction discrimination block 302 is sent to an output separation block 304. The output of the permissible range determination block 300 is also sent to the output separation block 304 unmodified. The output separation block 304 operates based on the discrimination result of the malfunction discrimination block 302 to separates or divide those of the inputted sensor outputs that have not been found to be faulty into values for the respective types and then output them.

In FIG. 4, "4 values OK" signifies that all four of the N2 sensors 64 have been found to be normal, "3 values OK" signifies that three of the four of the N2 sensors 64 have been found to be normal, "2 values OK" signifies that two of the four N2 sensors 64 have been found to be normal, and "1 value OK" signifies that one of the four N2 sensors 64 has been found to be normal. "All NG" signifies that all outputs of the N2 sensors 64 have been found to be faulty (NG means no good).

The TLA sensors 84 and other sensors are treated similarly, so that "3 values OK" signifies that all outputs of a sensor type having three outputs, such as the TLA sensors, have been found to be normal, "2 values OK" signifies that two outputs among three outputs have been found to be normal and that both of the two outputs of the N1 sensors 62 have been found to be normal, and "1 value OK" signifies that one output of the two outputs of the N1 sensor 62 has been found to be normal. "All NG" again signifies that all outputs of the sensors of the type concerned have been found to be faulty.

The output of the output separation block 304 is sent to an output selection block 306. Any sensor output that the permissible range determination block 300 refrained from determining and forwarded attached with a temporary-suspension flag is also sent to the output selection block 306. The output selection block 306, on the one hand, eliminates sensor outputs on which determination has not been passed and, on the other hand, selects the signals to be compared, whereafter it sends them to an acceptability determination block (determiner) 308, which compares outputs of the same type with each other(s) to determine whether they are within a range that allows them to be considered identical, thereby discriminating whether they are sensor outputs usable for fuel supply control.

The "comparison" referred to in the acceptability determination block 308 will be explained. When only one value is inputted, there is no value to compare with each other and the value is outputted as a control signal without modification. Since only a single control signal is outputted in this case, one of the lanes 200, 202 refers to the signal input to the other lane.

When two values are to be compared, specifically, discrimination is made as to whether they both fall in a range that allows them to be considered identical. When they are within such a range of permissibility, two signals are outputted as control signals, one to each of the lanes 200, 202.

Similar ranges are also established for the other parameters but will not be explained here in detail. The ranges are established using different values depending on whether the operating condition of the engine 10 is in transient or steady state. One or the other is therefore selected based on the operating condition discrimination result explained later. The ranges are also used in the three-value comparison and the four-value comparison discussed next.

Figure 6:
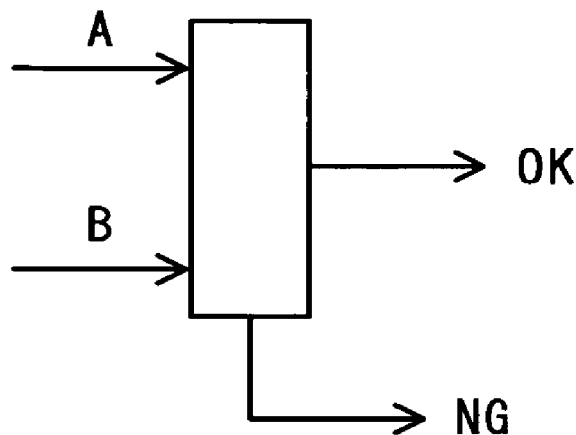
FIG. 6 is a block diagram showing three-value comparison conducted in the acceptability determination block of FIG. 4.
Figure 6:
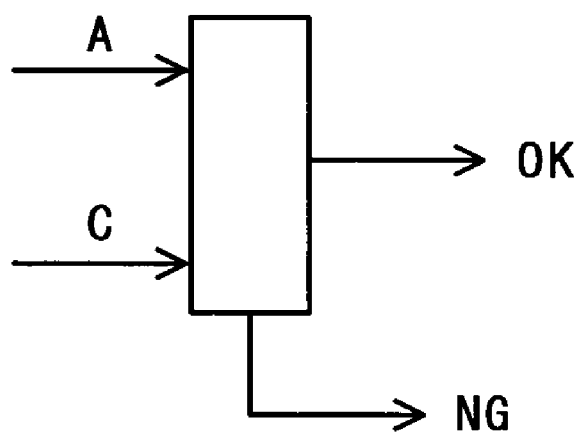
Figure 6:
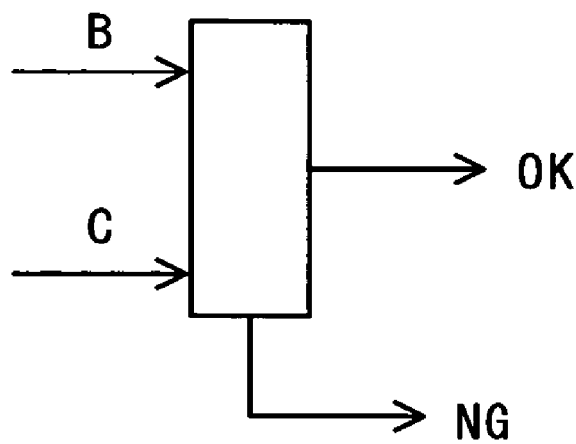

In three-value comparison, two-value comparison is done three times as shown in FIG. 6. The comparison result is determined as shown in FIG. 7 and used as the basis for selecting a signal usable as the control signal and also for determining signal abnormality. Referring to FIG. 3 by way of example, "A" is the sensor output received by the lane concerned, "B" is the sensor output received by the other lane, and "C" is the sensor output that is inputted through the CAN communications system. The assigned symbols (A, B and C) indicate priority (i.e., A is superior to B; B is superior to C). Thus, when the determination is the same for all sensor signals, A is used as the control signal.

As shown in FIG. 7, discrimination is made in accordance with the illustrated logic based on the comparison results. Case 1 is when no abnormal signal has been found, Case 2 is when one abnormal signal has been found, and Case 3 is when all signals have been found to be abnormal. In Case 3, all of the sensor outputs are discriminated to be abnormal and when one of them is in use as the control signal, it is fixed (frozen) at its value and maintained in use, and a warning is issued. In Case 1 whose "A" is followed by an encircled 2, "A" is determined to be probably most reliable because some probability of malfunction occurrence is present for "B" and "C" though very slight.

Figure 8:
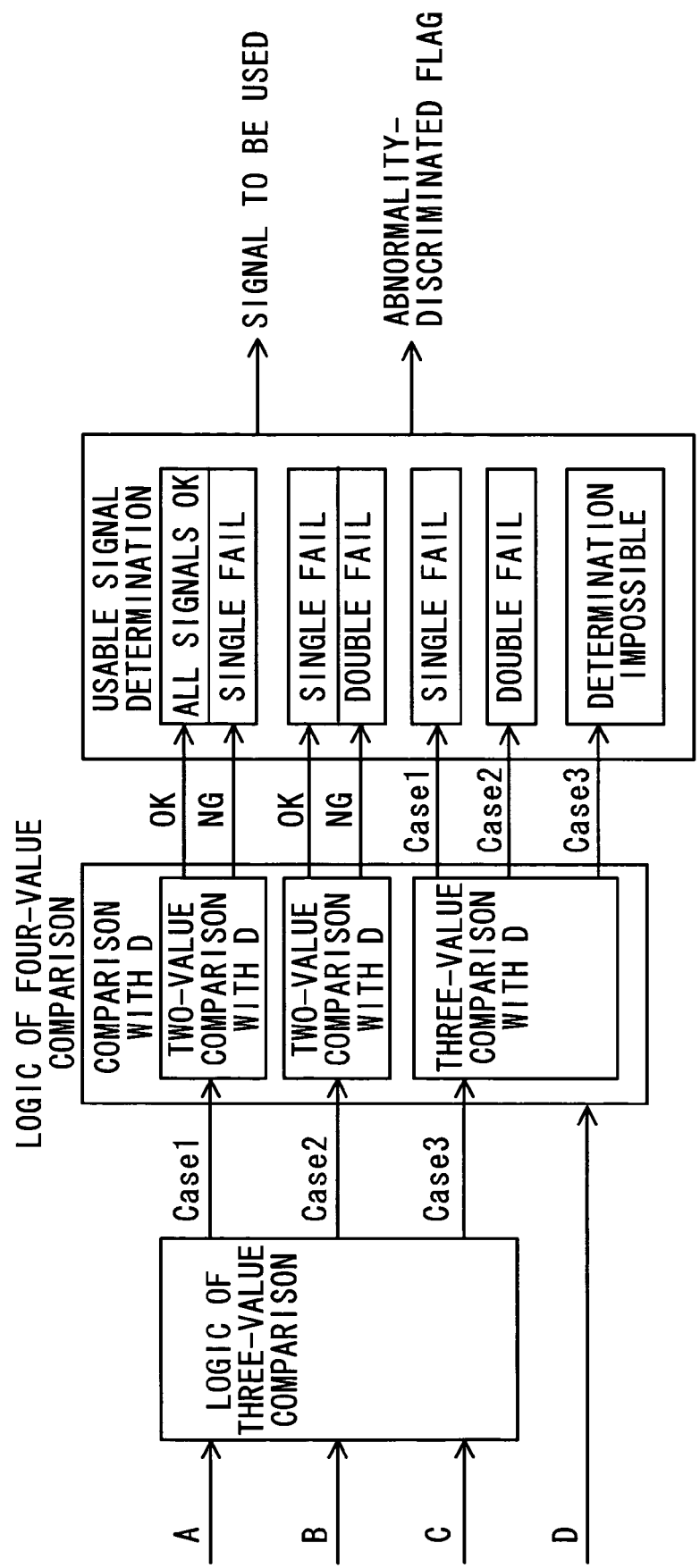
FIG. 8 is a block diagram showing four-value comparison conducted in the acceptability determination block of FIG. 4.

As shown in FIG. 8, four-value comparison is done by conducting two-value comparison three times using three of the four values and then comparing the signals (sensor outputs) found normal with the fourth value. Since the sensor having four outputs is only the N2 sensor 64, "A" is the output of the N2 sensor A received by the lane concerned, "B" is the output of the N2 sensor A received by the other lane, "C" is the N2 sensor B received by the lane concerned and "D" is the output of the N2 sensor B received by the other lane. As mentioned above, the assigned symbols (A, B, C and D) indicate priority. Therefore, three-value comparison is performed on "A", "B" and "C" of higher priority in the order mentioned and when all are found to be normal (Case 1), or when one of the three values is found to be an abnormal signal (Case 2), two-value comparison is performed between these and "D", whose priority is the lowest. Aside from the point that no warning is issued, the three-value comparison itself does not differ from that shown in FIG. 6.

As shown in FIG. 8, when the three-value, comparison result is Case 1, the result of the two-value comparison with "D" is either that the four outputs are normal (All Signals Normal) or that "D" is abnormal (Single Fail). When the three-value comparison result is Case 2, the result of the two-value comparison with "D" is either that one of the four outputs is abnormal (Single Fail) or that "D" and one other output are abnormal (Double Fail).

Figure 9:
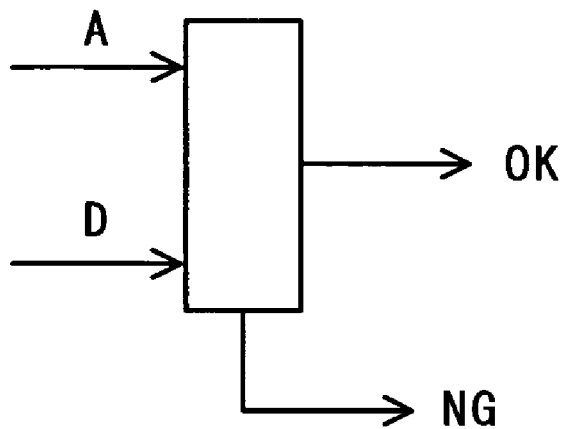
FIG. 9 is a block diagram showing comparison with a remaining value when the three values in the four-value comparison of FIG. 8 is abnormal.
Figure 9:
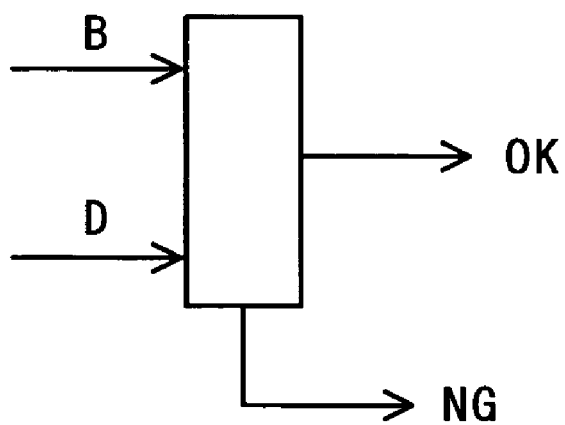
Figure 9:
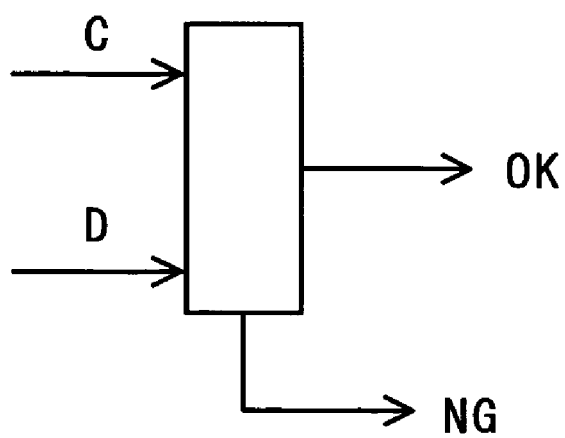

When the three-value comparison result is Case 3, three-value comparison with "D" is performed and, if possible, the signal to be used is selected. The comparison logic for this is shown in FIG. 9 and acceptability determination based on the comparison result is shown in FIG. 10. Case 1 and Case 2 in FIG. 10 indicate cases in which selection of the signal to be used is made by re-comparison with "D". As shown, the re-comparison with "D" sometimes results in selection as the signal to be used of one of the "A", "B" and "C" signals that has once been found abnormal. In Case 3 of FIG. 10, similarly to in Case 3 of FIG. 7, all of the sensor outputs are discriminated to be abnormal, and when one of them is in use as the control signal, it is fixed (frozen) at its value and maintained in use, and the warning is issued.

When abnormality is discriminated (determined) in three-value comparison or four-value comparison in the foregoing manner, the acceptability determination block 308 sets the bit of the associated flag among the abnormality-discriminated flags established for the individual sensor outputs to 1 and when, differently from the foregoing, no abnormality is discriminated (determined), it sets the bit to 0. As shown in FIG. 4, the bit information of an abnormality-discriminated flag of the acceptability determination block 308 is sent to the malfunction discrimination block 302 where it is subjected to processing like that described above.

The remainder of FIG. 5 will now be explained. In step 302o of the malfunction discrimination block 302, it is determined or checked whether the bit of the inputted abnormality-discriminated flag is 0, i.e., whether the sensor output associated with the flag has been found to be normal.

When step 302o finds that the bit of the flag is reset to 0, its output (discrimination result) is sent to step 302p, where the value of an FC (flag counter; similar to that referred to earlier) is set to −1. When step 302o finds that the bit of the input flag is set to 1, i.e., that the sensor output associated with the flag has beens found to be abnormal, its output is sent to step 302q, where the value of FC is set to +2.

Next, in step 302r, the total (accumulated) value of FC is calculated by addition to or subtraction from the value of FC in the preceding cycle, whereafter step 302s determines or checks whether the value of FC (total value) is smaller than 8 (second predetermined value). The foregoing steps are executed once every 10 msec. After 8 cycles of the steps have been executed (i.e., after 80 msec), step 302t determines or checks whether the value of FC (total value) is smaller than 1 (first predetermined value), whereafter the value of FC is reset by the timer reset 302g. When the result in step 302t at the time of the reset is also YES, it is determined in the following step 302u that the sensor concerned, i.e., the sensor corresponding to the sensor output found to be abnormal from the bit of the abnormality-discriminated flag, is not faulty (is normal).

Similarly to the case mentioned above, when the sensor being checked has incurred a problem, step 302o repeatedly discriminates sensor failure, so that step 302q repeatedly assigns FC the value +2. Therefore, after 4 cycles (40 msec), step 302s finds that the accumulated value of FC is no longer smaller than 8 (second predetermined value) and produces a NO result, whereafter the sensor concerned, i.e., the sensor corresponding to the sensor output found to be abnormal from the bit of the abnormality-discriminated flag, is determined to be faulty in step 302v.

On the other hand, so long as the sensor is repeatedly found to be normal during a period of 80 msec, step 302p repeatedly assigns FC the value −1, so that the determination in step 302t is YES and the sensor is found to be normal in step 302u. However, when the sensor output is found to be sporadically outside the permissible range three or more times during the period of 80 msec, the determination in step 302t at the time of reset becomes NO, so that step 302v finds the sensor to be faulty.

As a result, the time period required to determine that the sensor is faulty based on the sensor output being abnormal four consecutive times is within the fuel supply control time period (second predetermined time period), more exactly, is equal to the fuel supply control time period. Here again, the second predetermined value (8) is set to a value corresponding to a time period that is equal to or shorter than ½ the time period represented by the first predetermined value (1). In addition, when any sensor is determined (detected) to be faulty and another sensor of the same type is determined to be normal, the aforesaid fuel supply control is conducted using the output of the normal sensor. When all sensors of the same type are found to be faulty, a predetermined value is set and control is continued. This is the same as what is explained above.

The explanation of FIG. 4 will be continued. The output of the permissible range determination block 300 is sent to a transient/steady-state discrimination block (discriminator) 310 which discriminates the operating condition of the engine 10.

Figure 11:
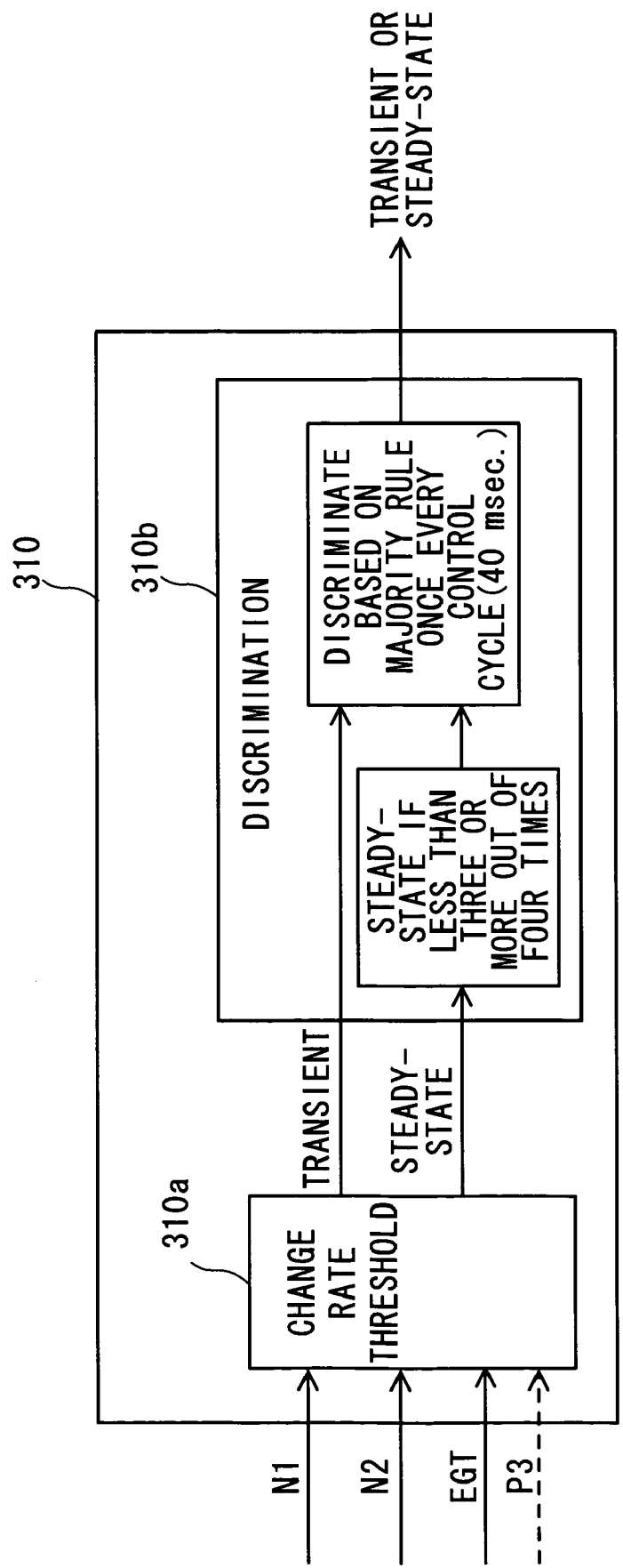
FIG. 11 is a block diagram showing in detail the configuration of the transient/steady-state discrimination block of FIG. 4.

FIG. 11 is a block diagram showing in detail the configuration of the transient/steady-state discrimination block 310.

As shown in this drawing, the sensor outputs (parameters) used in the transient/steady-state discrimination are one each of the outputs of the N1 sensors 62, the two (A and B) N2 sensors 64 and EGT sensors 76 and the outputs of the P3 sensors 74. (Specifically, the high-priority outputs "A" are used insofar as they are found to be normal.)

Specifically, the discrimination of the primary lane 200 is done using the four sensor outputs N1, N2A, N2B and EGT, while the discrimination of the secondary lane 202 is done using five sensor outputs, namely, the aforesaid four sensor outputs plus output P3. The reason for including P3 among the parameters for discrimination in the secondary lane 202 is that the discrimination in the secondary lane 202 needs to be conducted with greater care because the lane 202 is a secondary lane subjected to fuel supply control in place of the primary lane 200 when a malfunction has occurred in the primary lane 200.

The four or five outputs are sent to a change rate threshold block 310a once every predetermined period of time, i.e., 10 msec to be compared with change rate threshold values predefined for the individual sensors.

As shown in FIG. 11, the change rate threshold block 310a forwards the results of comparing the inputted values with the corresponding threshold values to a discrimination block 310b. The discrimination block 310b uses the comparison results to discriminate the operating condition once every 40 msec. Basically, the discrimination is made based on the majority rule. Specifically, in the case of the primary lane 200, the engine 10 is discriminated to be in transient state when two or more (half or more) of the four values are equal to or greater than the corresponding threshold values and is discriminated to be in steady state when two or more of the four values are found to be smaller than the corresponding threshold values three consecutive times or three out of four times. The comparison is made between the inputted values and the threshold values once every 10 msec, so that comparison is made four times within a period of 40 msec. When the number becomes the same between two like values among the four values, one of the N2 sensor 64 outputs is eliminated and the remaining three values are compared with each others such that the discrimination result is in the majority is generated.

In the case of the secondary lane 202, the engine 10 is discriminated to be in transient state when three or more of the five values are equal to or greater than the corresponding threshold values. On the other hand, the engine 10 is discriminated to be in steady state when three or more of the five values are found to be smaller than the corresponding threshold values three consecutive times or three times out of four times.

In discrimination of the lanes 200 and 202 using TLA, the engine 10 is found to be in transient state when two or more of three values are equal to or greater than the corresponding threshold values. On the other hand, the engine 10 is found to be in steady state when two or more of three values are found to be smaller than the corresponding threshold values three consecutive times or three out of four times. Although discrimination is explained in the foregoing as being made using the change rate of values outputted once every predetermined time period, it is possible to calculate the differences between like values outputted once every predetermined time period and use them as threshold values.

The explanation of FIG. 4 will be continued. The discrimination result of the transient/steady-state discrimination block 310 is sent to the acceptability determination block 308. In accordance with the discrimination result, the acceptability determination block 308 selects and uses one or the other of the ranges for the transient and steady states established beforehand as ranges of permissibility (within which values can be considered identical). It also effects appropriate fuel supply control based on the discrimination result of the transient/steady-state discrimination block 310.

With respect to N1, P3, EGT and the like, a composite signal generator 312 produces a composite signal using values estimated from other parameters and the acceptability determination block 308 again makes an acceptability determination through comparison therewith.

As described above, the embodiment is configured to have a system for detecting sensor malfunction of a gas-turbine engine 10, comprising: a sensor (N1 sensor 62, N2 sensor 64, etc.) installed at the engine and outputting a value indicative of operating condition of the engine; a determiner (step 300a of permissible range determination block 300) inputting the value outputted from the sensor and determining once every first predetermined time period (10 msec) whether the outputted value is not within a permissible range; and a discriminator (step 302h of malfunction discrimination block 302) inputting a result of determination of the determiner and discriminating that the sensor is faulty, when the result is at least one of a case in which number of times, the outputted value is determined not to be within the permissible range, is not smaller than a first predetermined value (1; the accumulated value of FC is not fewer than 1 (step 302e)) and a case in which the number of times, the outputted value is consecutively determined not to be within the permissible range, is not smaller than a second predetermined value (8; the accumulated value of FC is not fewer than 8 (step 302d)).

Thus, the sensor malfunction detection system for a gas-turbine engine according to the first aspect of the invention is configured to determine or check once every first predetermined time period whether the outputted value from the sensor is within a permissible range and determines that the sensor is faulty when the result of the check is at least one result between the case of the number of times the outputted value is found not to be within the permissible range exceeding a first predetermined value and the case of the number of times the outputted value is consecutively found not to be within the permissible range exceeding a second predetermined value. Since the so-configured system discriminates whether the total number of times the sensor output is found to be outside the permissible range is fewer than the first predetermined value, it can avoid erroneous detection of transient abnormalities caused by noise or the like as sensor malfunction, and since it discriminates whether the number of times the sensor output is consecutively found not to be within the permissible range is fewer than the second predetermined value, it can promptly detect sensor malfunction owing to wire breakage or the like. The system according to the first aspect can therefore detect sensor malfunction with good accuracy using a simple configuration.

The system further includes: a fuel control unit (ECU 80 and FCU 30) calculating a flow rate of fuel to be supplied to the engine once every second predetermined time period (40 msec) that is m (m≧2; more specifically 4) times of the first predetermined time period and controlling fuel supply so as to supply fuel at the calculated flow rate; and the second predetermined value (8) is set a value that is equal to or smaller than, (more precisely equal to) a value corresponding to the second predetermined time period.

The sensor malfunction detection system for a gas-turbine engine according to the second aspect of the invention is configured to set a second predetermined value to be equal to or smaller than a value corresponding to the second predetermined time period equal to the fuel control cycle. Since the system according to the second aspect is therefore able to detect sensor malfunction within a single cycle of fuel control requiring substantially instantaneous response, it can, in addition to providing the foregoing advantages, further enable prompt response to a detected malfunction in the succeeding fuel control cycle. In the embodiment, although the second predetermined value (8) is set to a value that is equal to the value corresponding to the second predetermined time period, it may be set to a value smaller than the value corresponding to the second predetermined time period.

The system further includes: a fuel control unit (ECU 80 and FCU 30) calculating a flow rate of fuel to be supplied to the engine once every second predetermined time period that is m (m≧2) times of the first predetermined time period and controlling fuel supply so as to supply fuel at the calculated flow rate; and the second predetermined value (8) is set a time period that is equal to or smaller than one-half of a time period (80 msec) represented by the first predetermined value (1).

The sensor malfunction detection system for a gas-turbine engine according to the third aspect of the invention is configured to set the second predetermined value to a value corresponding to a time period equal to or smaller than one-half the time period represented by the first predetermined value. In other words, the system is configured so that the time period required for determining sensor malfunction is equal to or smaller than one-half the time required for discriminating transient abnormalities when the sensor output is not within the permissible range owing to noise or similar cause. Since the system according the third aspect is therefore able to detect sensor malfunction at an early stage, it can, in addition to providing the foregoing advantages, further similarly enable prompt response in fuel control requiring substantially instantaneous response. In the embodiment, although the second predetermined value (8) is set a time period that is equal to one-half of the time period (80 msec) represented by the first predetermined value (1), it may be set to a time period that is smaller than one-half of the time period (80 msec) represented by the first predetermined value (1).

The system further includes: a second determiner (step 300b of permissible range determination block 300) inputting the value outputted from the sensor and determining once every first predetermined time period (10 msec) whether change rate of the outputted value is not within a second permissible range; and a second discriminator (step 302l of malfunction discrimination block 302) inputting a result of determination of the second determiner and discriminating that the sensor is faulty, when number of times, the change rate of the outputted value is determined not to be within the permissible range, is not smaller than a third predetermined value (1; the accumulated value of FC is not fewer than 1).

The sensor malfunction detection system for a gas-turbine engine according to the fourth aspect of the invention is configured to check once every first predetermined time period whether the change rate of the outputted value is within a second permissible range and determine that the sensor is faulty when the number of times the change rate is found not to be within the second permissible range is fewer than a third predetermined value. Therefore, in addition to providing the foregoing advantages, the system according to the fourth aspect can further enable sensor malfunction to be detected with still higher accuracy. In the embodiment, the third predetermined value is made the same as the first predetermined value, but it may be different the first predetermined value.

The embodiment is also configured to have a system for detecting sensor malfunction of a gas-turbine engine 10, comprising: a pair of sensors (N1 sensor 62, N2 sensor 64, etc.) each installed at the engine and each outputting a value indicative of operating condition of the engine; a determiner (acceptability determination block 308) inputting the values outputted from the sensors and determining whether each of the outputted values is normal or abnormal by comparing the outputted values with each other; a first discriminator (step 302o of malfunction discrimination block 302) inputting a result of determination (abnormality-discriminated flag, more specifically its bit) of the determiner and discriminating once every first predetermined time period (10 msec) whether one of the outputted values is determined to be abnormal; and a second discriminator (step 302v of malfunction discrimination block 302) inputting a result of discrimination of the first discriminator and discriminating that one of the sensors whose output value is determined to be abnormal is faulty, when the result is at least one of a case in which number of times, the one of the outputted values is determined to be abnormal range, is not smaller than a first predetermined value (1; the accumulated value of FC is not fewer than 1 (302t)), and a case in which the number of times, the one of the outputted values is consecutively determined to be abnormal, is not smaller than a second predetermined value (8; the accumulated value of FC is not fewer than 8 (302s)).

The sensor malfunction detection system for a gas-turbine engine according to the fifth aspect of the invention is configured to be inputted with the outputs of at least one sensor group, determinate whether the sensor outputs are normal or abnormal by comparing them with each other, output the result of the determination, discriminates or check once every first predetermined time period whether an abnormal sensor output is found, and discriminate that the sensor that produced the sensor output found to be abnormal is faulty when the result of the check is at least one result between the case of the number of times the sensor output is found to be abnormal not being fewer than a first predetermined value and the case of the number of times the sensor output is consecutively found to be abnormal not being fewer than a second predetermined value. The system according to the fifth aspect also can avoid erroneous detection of transient abnormalities caused by noise or the like as sensor malfunction and promptly detect sensor malfunction owing to wire breakage or the like. The system can therefore detect sensor malfunction with good accuracy using a simple configuration.

The system further includes: a fuel control unit (ECU 80 and FCU 30) calculating a flow rate of fuel to be supplied to the engine once every second predetermined time period (40 msec) that is m (m≧2) times of the first predetermined time period and controlling fuel supply so as to supply fuel at the calculated flow rate; and the second predetermined value (8) is set a value that is equal to or smaller than (more specifically equal to) a value corresponding to the second predetermined time period.

The sensor malfunction detection system for a gas-turbine engine according to the sixth aspect of the invention is configured to set a second predetermined value to be equal to or smaller than a value corresponding to the second predetermined time period equal to a fuel control cycle. Since the system is therefore able to detect sensor malfunction within a single cycle of fuel control requiring substantially instantaneous response, it can, in addition to providing the foregoing advantages, further enable prompt response to a detected malfunction in the succeeding fuel control cycle.

The system further includes: a fuel control unit (ECU 80 and FCU 30) calculating a flow rate of fuel to be supplied to the engine once every second predetermined time period that is m (m≧2) times of the first predetermined time period and controlling fuel supply so as to supply fuel at the calculated flow rate; and the second predetermined value (8) is set a time period that is equal to or smaller than one-half of a time period (80 msec) represented by the first predetermined value.

The sensor malfunction detection system for a gas-turbine engine according to the seventh aspect of the invention is configured to set the second predetermined value to a value corresponding to a time period equal to or smaller than one-half the time period represented by the first predetermined value. In other words, the system is configured so that the time period required for determining sensor malfunction is equal to or smaller than one-half the time required for discriminating transient abnormalities when the sensor output is not within the permissible range owing to noise or similar cause. Since the system is therefore able to detect sensor malfunction at an early stage, it can, in addition to providing the foregoing advantages, further enable prompt response in fuel control requiring substantially instantaneous response.

In the above, the sensor is one (N1 sensor 62 and N2 sensor 64) that outputs the value indicative of a rotational speed of a turbine of the engine, or the sensors are ones (N1 sensor 62 and N2 sensor 64) that output the value indicative of a rotational speed of a turbine of the engine.

The sensor malfunction detection system for a gas-turbine engine according to the eighth and ninth aspects of the invention is configured so that at least one of the sensor and the sensor group is a sensor or sensor group that outputs a value representing the rotational speed of the turbine. Therefore, the system can, in addition to providing the foregoing advantages, accurately detect, and promptly respond appropriately to, malfunction of a sensor that outputs a parameter that is relatively important among parameters indicating the operating condition of the gas-turbine engine.

Although a turbofan engine has been used as an example of a gas-turbine aeroengine in the foregoing embodiment, the engine can instead be a turbojet engine, turboprop engine, turboshaft engine or the like.

Japanese Patent Application Nos. 2004-106420 filed on Mar. 31, 2004, and 2004-156635 filed on May 26, 2004, are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for detecting sensor malfunction of a gas-turbine engine, comprising:
    a sensor installed at the engine and outputting a value indicative of operating condition of the engine;
    a determiner inputting the value outputted from the sensor and determining once every first predetermined time period whether the outputted value is not within a permissible range;
    a discriminator inputting a result of determination of the determiner and discriminating that the sensor is faulty, when the result is at least one of a case in which number of times the outputted value is determined not to be within the permissible range, is not smaller than a first predetermined value, and a case in which the number of times, the outputted value is consecutively determined not to be within the permissible range, is not smaller than a second predetermined value; and
    a fuel control unit calculating a flow rate of fuel to be supplied to the engine once every second predetermined time period that is m (m≧2) times of the first predetermined time period and controlling fuel supply so as to supply fuel at the calculated flow rate;
    and the second predetermined value is set a value that is equal to or smaller than a value corresponding to the second predetermined time period.

2. The system according to claim 1, further including:
    a second determiner inputting the value outputted from the sensor and determining once every first predetermined time period whether change rate of the outputted value is not within a second permissible range; and
    a second discriminator inputting a result of determination of the second determiner and discriminating that the sensor is faulty, when number of times, the change rate of the outputted value is determined not to be within the second permissible range, is not smaller than a third predetermined value.

3. The system according to claim 1, wherein the sensor is one that outputs the value indicative of a rotational speed of a turbine of the engine.

4. A system for detecting sensor malfunction of a gas-turbine engine, comprising:
    a sensor installed at the engine and outputting a value indicative of operating condition of the engine;
    a determiner inputting the value outputted from the sensor and determining once every first predetermined time period whether the outputted value is not within a permissible range;
    a discriminator inputting a result of determination of the determiner and discriminating that the sensor is faulty, when the result is at least one of a case in which number of times, the outputted value is determined not to be within the permissible range, is not smaller than a first predetermined value and a case in which the number of times the outputted value is consecutively determined not to be within the permissible range, is not smaller than a second predetermined value; and
    a fuel control unit calculating a flow rate of fuel to be supplied to the engine once every second predetermined time period that is m (m≧2) times of the first predetermined time period and controlling fuel supply so as to supply fuel at the calculated flow rate;

and the second predetermined value is set a time period that is equal to or smaller than one-half of a time period represented by the first predetermined value.

5. The system according to claim 4, wherein the sensor is one that outputs the value indicative of a rotational speed of a turbine of the engine.

6. The system according to claim 4, further including:
a second determiner inputting the value outputted from the sensor and determining once every first predetermined time period whether change rate of the outputted value is not within a second permissible range; and
a second discriminator inputting a result of determination of the second determiner and discriminating that the sensor is faulty, when number of times, the change rate of the outputted value is determined not to be within the second permissible range, is not smaller than a third predetermined value.

7. A system for detecting sensor malfunction of a gas-turbine engine, comprising:
a pair of sensors each installed at the engine and each outputting a value indicative of operating condition of the engine;
a determiner inputting the values outputted from the sensors and determining whether each of the outputted values is normal or abnormal by comparing the outputted values with each other;
a first discriminator inputting a result of determination of the determiner and discriminating once every first predetermined time period whether one of the outputted values is determined to be abnormal; and
a fuel control unit calculating a flow rate of fuel to be supplied to the engine once every second predetermined time period that is m (m≧2) times of the first predetermined time period and controlling fuel supply so as to supply fuel at the calculated flow rate;
and the second predetermined value is set a value that is equal to or smaller than a value corresponding to the second predetermined time period.

8. The system according to claim 7, wherein the sensors are ones that output the value indicative of a rotational speed of a turbine of the engine.

9. A system for detecting sensor malfunction of a gas-turbine engine, comprising:
a pair of sensors each installed at the engine and each outputting a value indicative of operating condition of the engine;
a determiner inputting the values outputted from the sensors and determining whether each of the outputted values is normal or abnormal by comparing the outputted values with each other;
a first discriminator inputting a result of determination of the determiner and discriminating once every first predetermined time period whether one of the outputted values is determined to be abnormal; and
a fuel control unit calculating a flow rate of fuel to be supplied to the engine once every second predetermined time period that is m (m≧2) times of the first predetermined time period and controlling fuel supply so as to supply fuel at the calculated flow rate;
and the second predetermined value is set a time period that is equal to or smaller than one-half of a time period represented by the first predetermined value.

10. The system according to claim 9, wherein the sensors are ones that output the value indicative of a rotational speed of a turbine of the engine.

11. A method of detecting malfunction of a sensor installed at gas-turbine engine and outputting a value indicative of operating condition of the engine, comprising the steps of:
inputting the value outputted from the sensor and determining once every first predetermined time period whether the outputted value is not within a permissible range;
inputting a result of determination and discriminating that the sensor is faulty when the result is at least one of a case in which number of times, the outputted value is determined not to be within the permissible range, is not smaller than a first predetermined value, and a case in which the number of times, the outputted value is consecutively determined not to be within the permissible range, is not smaller than a second predetermined value; and
calculating a flow rate of fuel to be supplied to the engine once every second predetermined time period that is m (m≧2) times of the first predetermined time period and controlling fuel supply so as to supply fuel at the calculated flow rate;
and the second predetermined value is set a value that is equal to or smaller than a value corresponding to the second predetermined time period.

12. The method according to claim 11, further including the steps of:
inputting the value outputted from the sensor and determining once every first predetermined time period whether change rate of the outputted value is not within a second permissible range; and
inputting a result of determination and discriminating that the sensor is faulty, when number of times, the change rate of the outputted value is determined not to be within the second permissible range, is not smaller than a third predetermined value.

13. The method according to claim 11, wherein the sensor is one that outputs the value indicative of a rotational speed of a turbine of the engine.

14. A method of detecting malfunction of a sensor installed at a gas-turbine engine and outputting a value indicative of operating condition of the engine, comprising the steps of:
inputting the value outputted from the sensor and determining once every first predetermined time period whether the outputted value is not within a permissible range;
inputting a result of determination and discriminating that the sensor is faulty when the result is at least one of a case in which number of times the outputted value is determined not to be within the permissible range, is not smaller than a first predetermined value and a case in which the number of times, the outputted value is consecutively determined not to be within the permissible range, is not smaller than a second predetermined value; and
calculating a flow rate of fuel to be supplied to the engine once every second predetermined time period that is m (m≧2) times of the first predetermined time period and controlling fuel supply so as to supply fuel at the calculated flow rate;
and the second predetermined value is set a time period that is equal to or smaller than one-half of a time period represented by the first predetermined value.

15. The method according to claim 14, wherein the sensor is one that outputs the value indicative of a rotational speed of a turbine of the engine.

16. The method according to claim 14, further including the steps of:

inputting the value outputted from the sensor and determining once every first predetermined time period whether change rate of the outputted value is not within a second permissible range; and inputting a result of determination and discriminating that the sensor is faulty, when number of times, the change rate of the outputted value is determined not to be within the second permissible range, is not smaller than a third predetermined value.

17. A method of detecting malfunction of sensors installed at a gas-turbine engine and outputting values indicative of operating condition of the engine, comprising the steps of:

inputting the values outputted from the sensors and determining whether each of the outputted values is normal or abnormal by comparing the outputted values with each other;

inputting a result of determination and discriminating once every first predetermined time period whether one of the outputted values is determined to be abnormal; and inputting a result of discrimination and discriminating that one of the sensors whose output value is determined to be abnormal is faulty, when the result is at least one of a case in which number of times, the one of the outputted values is determined to be abnormal range, is not smaller than a first predetermined value, and a case in which the number of times, the one of the outputted values is consecutively determined to be abnormal, is not smaller than a second predetermined value; and calculating a flow rate of fuel to be supplied to the engine once every second predetermined time period that is m (m$\geq$2) times of the first predetermined time period and controlling fuel supply so as to supply fuel at the calculated flow rate;

and the second predetermined value is set a value that is equal to or smaller than a value corresponding to the second predetermined time period.

18. The method according to claim 17, wherein the sensors are ones that output the value indicative of a rotational speed of a turbine of the engine.

19. A method of detecting malfunction of sensors installed at a gas-turbine engine and outputting values indicative of operating condition of the engine, comprising the steps of:

inputting the values outputted from the sensors and determining whether each of the outputted values is normal or abnormal by comparing the outputted values with each other, inputting a result of determination and discriminating once every first predetermined time period whether one of the outputted values is determined to be abnormal; and inputting a result of discrimination and discriminating that one of the sensors whose output value is determined to be abnormal is faulty, when the result is at least one of a case in which number of times, the one of the outputted values is determined to be abnormal range of smaller than a first predetermined value, and a case in which the number of times, the one of the outputted values is consecutively determined to be abnormal, is not smaller than a second predetermined value; and calculating a flow rate of fuel to be supplied to the engine once every second predetermined time period that is m (m$\geq$2) times of the first predetermined time period and controlling fuel supply so as to supply fuel at the calculated flow rate;

and the second predetermined value is set a time period that is equal to or smaller than one-half of a time period represented by the first predetermined value.

20. The method according to claim 19, wherein the sensors are ones that output the value indicative of a rotational speed of a turbine of the engine.

* * * * *